April 21, 1936. E. S. COOK ET AL 2,038,145
CONTROL FOR SLIDING WHEELS
Filed June 8, 1934 3 Sheets-Sheet 1
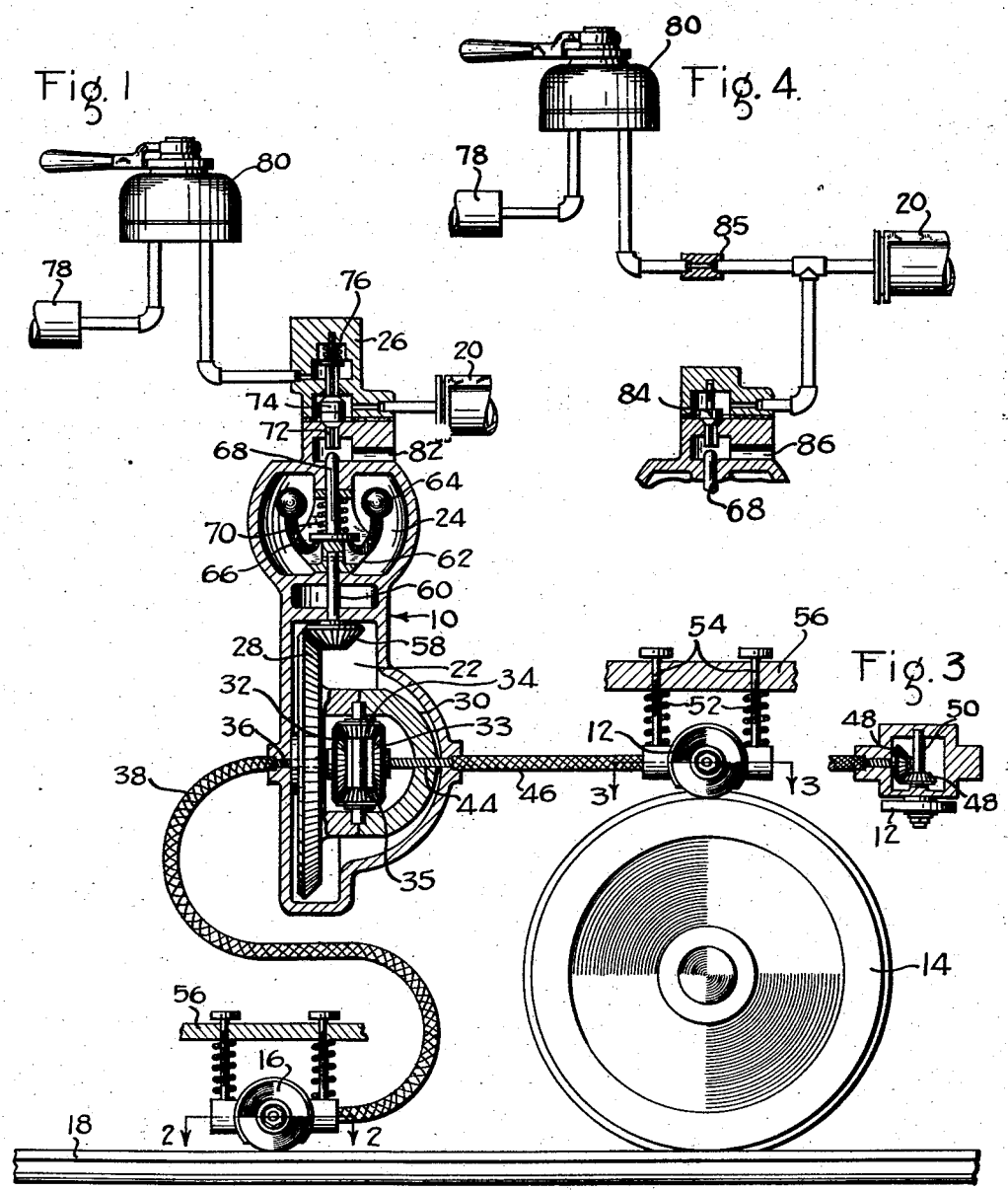
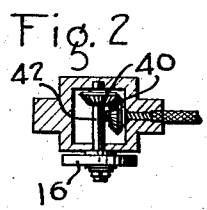
INVENTORS
EARLE S. COOK.
CHARLES F. HAMMER.
BY *Wm. M. Cady*
ATTORNEY

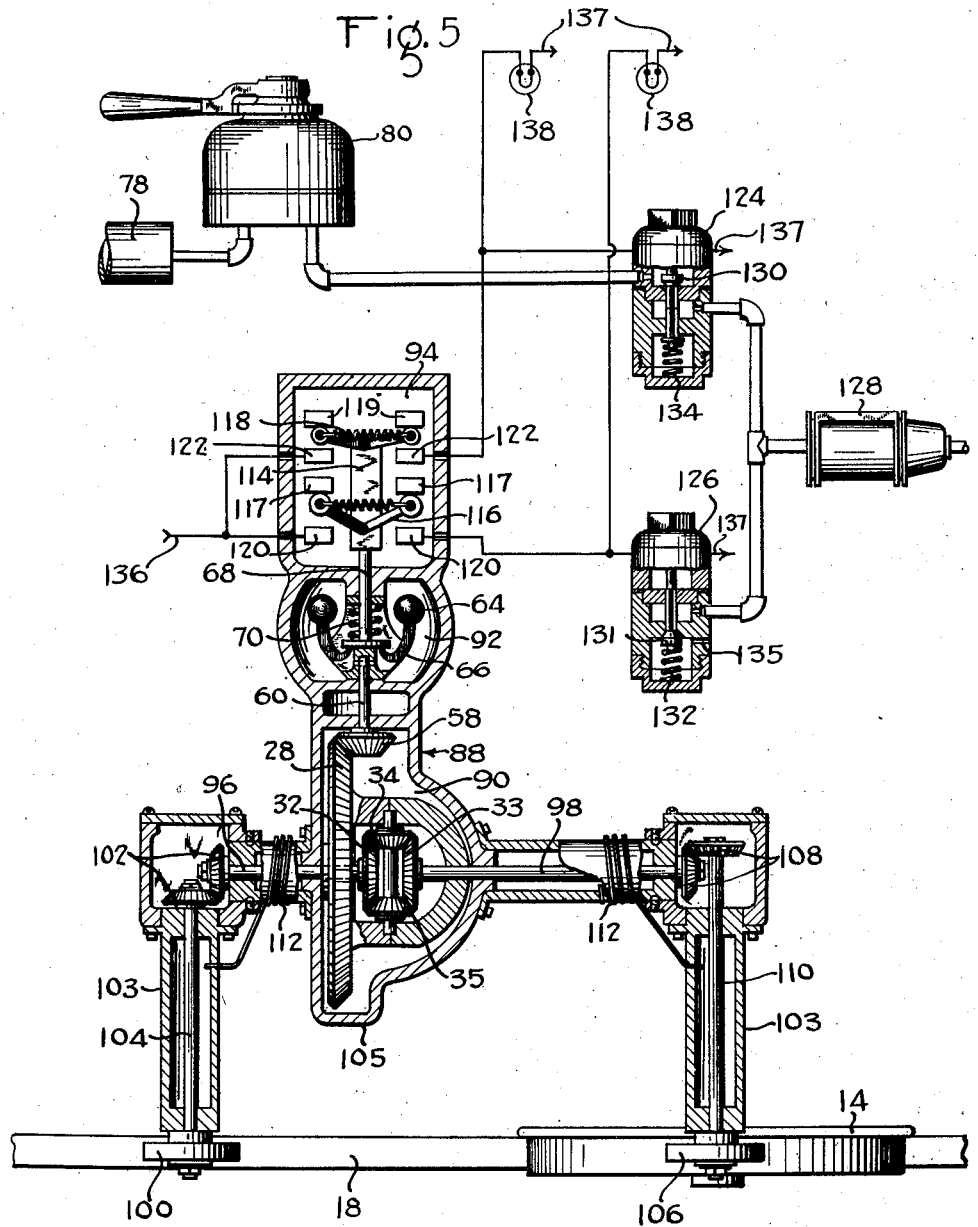

April 21, 1936.  E. S. COOK ET AL  2,038,145
CONTROL FOR SLIDING WHEELS
Filed June 8, 1934  3 Sheets-Sheet 3
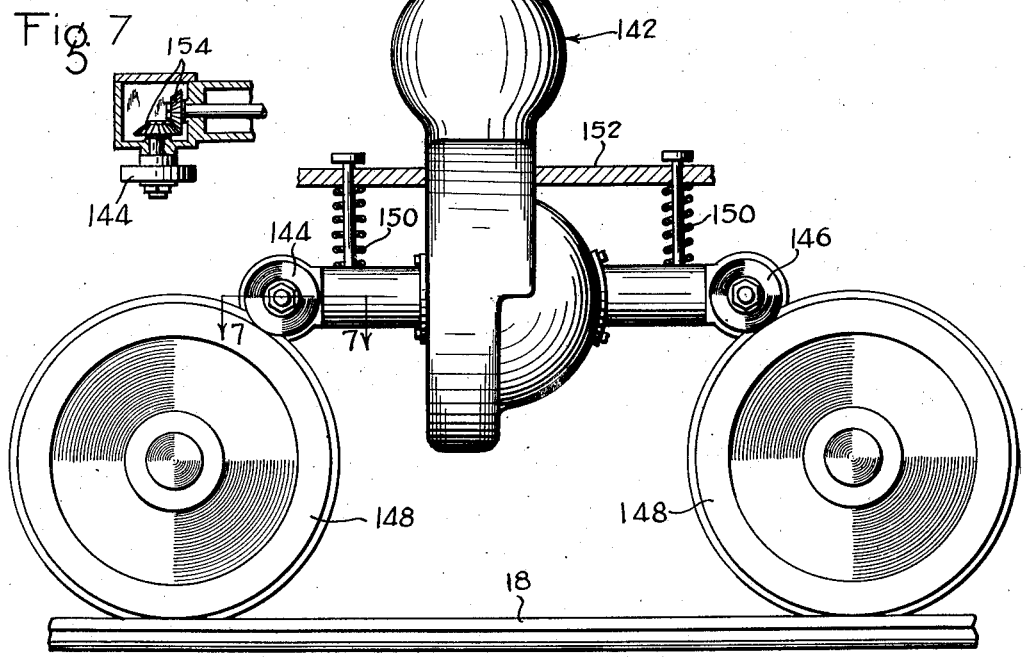
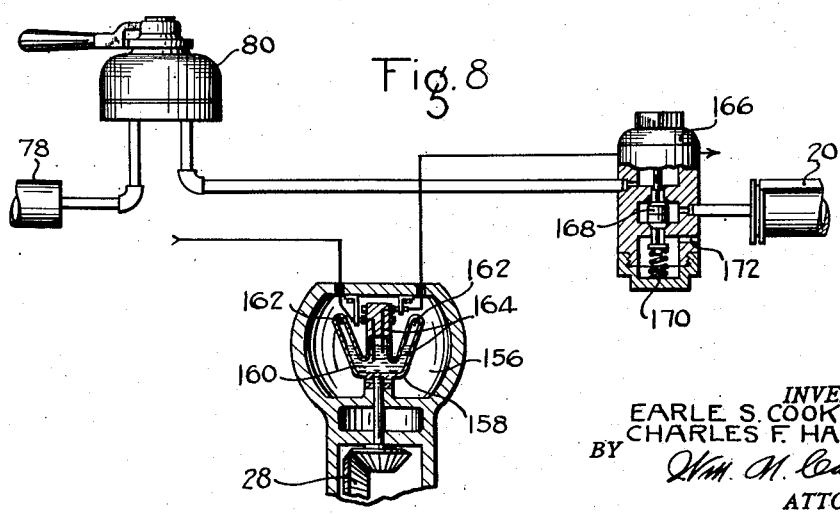
INVENTORS
EARLE S. COOK.
CHARLES F. HAMMER.
BY Wm. N. Cady
ATTORNEY Patented Apr. 21, 1936

2,038,145

UNITED STATES PATENT OFFICE 2,038,145

CONTROL FOR SLIDING WHEELS

Earle S. Cook, Wilkinsburg, and Charles F. Hammer, Greensburg, Pa., assignors to The Westinghouse Air Brake Company, Wilmerding, Pa., a corporation of Pennsylvania Application June 8, 1934, Serial No. 729,604

13 Claims. (Cl. 303—21)

This invention relates to a control for sliding wheels, and more particularly to means for detecting and relieving a sliding wheel condition when the brakes are applied on a railway train or traction vehicle.

When railway trains and traction vehicles are operated at very high speeds, high braking forces must be employed to bring the train or vehicle to a stop in a reasonable length of time. When such high braking forces are employed there is considerable danger of wheel sliding occurring. It is therefore desirable to provide, as a part of the braking equipment on high speed trains and vehicles, some means for detecting and relieving wheel sliding when it occurs.

It will be obvious of course that all of the wheels throughout a train or on a vehicle may not slide simultaneously, but most generally only a few wheels slide. Such means as is provided to detect and relieve wheel sliding should therefore be adapted to detect and relieve the sliding of individual wheels, or pairs of wheels. In addition, after sliding wheels commence to rotate again the brakes on those wheels should be reapplied, so as not to lose the effective retarding force produced by these brakes.

In carrying out our invention it is a principal object to provide means for detecting wheel sliding in the incipient stage and for then immediately functioning to relieve the wheel sliding condition, whether it occurs during a service or an emergency application of the brakes.

Another object of our invention is to provide a wheel sliding control means which is simple in operation and economical to manufacture, so that it may be applied to each axle, or pair of wheels, on a vehicle.

A further object of our invention is to provide a wheel sliding control apparatus which will function in cooperative relationship with other brake control apparatus normally employed in connection with high speed trains and vehicles, and which in case of failure will not hinder an application of the brakes by the regular control apparatus.

A yet further object of our invention is to provide a wheel sliding control means which is operable for either direction of travel of a vehicle or train.

A still further object is to provide means which will positively release the brakes on a sliding wheel and maintain the brakes released until the wheel is again rolling at a speed corresponding to the speed of the vehicle or train.

A still further object of the invention is to provide means for reapplying the brakes on a wheel after it has reached a speed corresponding to the speed of the train or vehicle, and to maintain the brakes applied up to the point which will not quite produce sliding of the wheel.

Yet further objects and advantages of our invention will be apparent from the several embodiments thereof described in this specification and illustrated in the attached drawings, wherein, Fig. 1 is a schematic arrangement of apparatus comprising one embodiment as applied to a single vehicle wheel.

Figs. 2 and 3 are detailed views, respectively, along lines 2—2 and 3—3 of Fig. 1.

Fig. 4 is a modification of the valve mechanism shown in Fig. 1.

Fig. 5 is another embodiment of our invention along lines similar to that shown in Fig. 1.

Fig. 6 is still another embodiment which operates in connection with a pair of vehicle wheels.

Fig. 7 is a detailed view along the line 7—7 of Fig. 6.

Fig. 8 is a modification which may be employed as a part of either of the embodiments shown.

While all of the embodiments have been illustrated in connection with a single vehicle wheel, or a single pair of wheels, it is to be understood that either embodiment may be employed in connection with the control of the brakes on as many wheels as is desired.

Considering now the embodiment shown in Fig. 1, we have provided a brake controlling mechanism 10 which operates upon differential movement between a tracer wheel 12, rotated by engagement with a vehicle wheel 14, and a tracer wheel 16, rotated by engagement with a track rail 18, to control the supply of fluid under pressure to a brake cylinder 20.

The brake controlling mechanism 10 is provided with a differential gear section 22, a centrifuge section 24, and a valve device section 26. The differential gear section may comprise a differential gear mechanism of the type commonly employed in automobiles, and as shown, may include a ring gear 28 carried by a differential housing 30, in which are suitably mounted differential gears 32, 33, 34, and 35. These gears are grouped in the manner commonly employed in differential gear mechanisms. The differential gear 32 is mechanically coupled to the tracer wheel 16 through a rigid shaft 36, a flexible shaft 38, and bevel gears 40, one of the bevel gears 40 being secured to a shaft 42 carrying the tracer wheel 16. The differential gear 33 may be mechanically connected to the tracer wheel 12 through a rigid shaft 44, a flexible shaft 46, and bevel gears 48, one of the bevel gears being secured to a shaft 50 carrying the tracer wheel 12.

When both tracer wheels 12 and 16 are rotating at the same speed the ring gear 28, and connected housing 30, will remain idle, but when either of the tracer wheels is rotating at a greater or lesser speed than the other, the ring gear and housing will be rotated at a speed according to the differential of speed between the two tracer wheels. The ring gear and connected housing overrun the two rigid shafts 36 and 44, as is common practice in differential gear mechanisms.

The tracer wheels 12 and 16 may be urged into contact with the vehicle wheel 14 and track rail 18, respectively, by springs 52 disposed on stems 54 secured to the casings carrying the tracer wheels. The stems 54 may be slidable with respect to supporting members 56 attached to some portion of the vehicle.

The ring gear 28 is adapted to mesh with a pinion 58 secured to a shaft 60 forming part of the centrifuge section 24. The centrifuge section may be provided with a rotatable member 62 secured to shaft 60 and carrying centrifuge weights 64 fulcrumed at 66 and adapted when rotated to swing outwardly to raise a plunger member 68 against opposition of a spring 70.

Actuation of the plunger member 68 upwardly engages a valve stem 72 of a double beat valve 74, to actuate the double beat valve from a lower seated position to an upper seated position, against opposition of a spring 76 normally urging the double beat valve 74 to lower seated position. The double beat valve 74 controls the flow of fluid from a source of supply of fluid under pressure, as for example a reservoir 78, to the brake cylinder 20, a brake valve device 80 being provided for manual control of the flow, as when initiating and releasing a brake application.

The brake valve device 80 may be of any of the types commonly employed for manual control of brake applications, such for example as a rotary type having the usual release, application and lap positions. For the purpose of this disclosure this brake valve device may be assumed to be of this type.

In operation, when it is desired to effect an application of the brakes, the handle of the brake valve device 80 is moved to application position to supply fluid under pressure to the brake cylinder 20 in accordance with a desired degree of braking. When the brakes are initially applied the two tracer wheels 12 and 16 will be rotating at the same speed, and consequently the ring gear 28 will remain motionless. If after the brakes are applied the vehicle wheel 14 should commence to slide, the tracer wheel 12 will rotate at a speed lower than that of the tracer wheel 16. The ring gear 28 will then be rotated according to the differential of speed between the two tracer wheels and thus drive the rotating member 62 of the centrifuge section 24.

Now the centrifuge section is arranged so that for slight differentials in speed between the two tracer wheels the plunger 68 will not engage the double beat valve stem 72, to actuate the double beat valve from its lower seated position, but if the value of this speed differential is above a predetermined value, which corresponds to an incipient stage of wheel sliding, then the double beat valve will be actuated from lower seated position to upper seated position. When this takes place the supply of fluid to the brake cylinder will be cut off and the brake cylinder will be vented to the atmosphere past the open lower seat and through port 82.

Release of fluid pressure from the brake cylinder 20 will release the brakes on the wheel 14, so that in a short time the wheel will commence to rotate again. As soon as the rotation of the vehicle wheel has approached substantially to that corresponding to the speed of the vehicle, the centrifuge device will be idle or rotating at such a low speed that the double beat valve 74 will be actuated to its lower seated position. Fluid under pressure may then again flow to the brake cylinder to reapply the brakes on the vehicle wheel.

It will thus be seen that the brake controlling mechanism 10 is actuated according to the differential of speed between a sliding wheel and that corresponding to the motion of the vehicle, to control the supply of fluid under pressure to the brake cylinder actuating the brakes on the sliding wheel, and that so long as the wheel is rotating at a speed corresponding substantially to the speed of the vehicle the brakes will remain applied. It will be noted that this operation will be the same for either direction of travel of the vehicle, as it depends solely upon the failure of a wheel to rotate at a speed corresponding to the speed of the vehicle.

In case it is not desired to wholly cut off the supply of fluid to the brake cylinder, a valve arrangement may be employed such as shown in Fig. 4. As there shown a pressure seated release valve 84 controls the release of fluid pressure from the brake cylinder 20 to the atmosphere, by way of port 86. The valve 84 is normally held in seated position so long as fluid pressure is present in the brake cylinder. When the centrifuge device operates its stem 68 upwardly, the valve 84 is unseated to release fluid pressure from the brake cylinder to the atmosphere faster than it can be supplied to the brake cylinder from reservoir 78 through choke 85, which acts to prevent too great loss of fluid from the reservoir 78.

While this arrangement may result in the loss of some fluid from the reservoir 78, it has the advantage of preventing total release of the brakes. Of course if the brake valve device 80 is in lap position after effecting an application of the brakes, the loss of fluid from the reservoir 78 is prevented.

Considering now the embodiment shown in Fig. 5, a brake controlling mechanism 88 is shown similar to the brake controlling mechanism 10 of Fig. 1, except that rigid connections to the tracer wheels are employed, and contacts are arranged to be operated by the centrifuge device to control operation of magnet valve devices.

Like the brake controlling mechanism 10, the brake controlling mechanism 88 of Fig. 5 is provided with a differential gear section 90 and a centrifuge section 92, and has in addition a switch section 94. The differential gear and centrifuge sections may be essentially the same as those shown in Fig. 1, and the same numerals are therefore employed to indicate like parts. Differential gears 32 and 33 are, respectively, secured to rigid shafts 96 and 98. The shaft 98 is mechanically connected to a tracer wheel 100 through bevel gears 102 and shaft 104. In a similar manner, shaft 98 is connected to tracer wheel 106 through bevel gears 108 and shaft 110. Spring devices 112, or similar mechanisms, may be employed to hold the tracer wheels in contact with the track rail and vehicle wheel, as shown, the housing 103 having a swivel connection with the housing 105.

The centrifuge section 92 is adapted to actuate a crosshead member 114 carrying switch toggle mechanisms 116 and 118. The toggle mechanism 116 reacts against stops 117 and is adapted to bridge contacts 120 with a snap action when the crosshead 114 is actuated upwardly. In a similar manner, the toggle mechanism 118 reacts against stops 119 and is adapted to bridge contacts 122 when the crosshead member is actuated upwardly. The arrangement of the toggle mechanisms is such that when the crosshead member is actuated upwardly the toggle mechanism 118 bridges contacts 122 before the toggle mechanism 116 bridges contacts 120.

Contacts 122 control energization of a cut-off magnet valve device 124, while contacts 120 control energization of a release magnet valve device 126. Magnet valve devices 124 and 126 control the supply of fluid under pressure to and its release from a brake cylinder 128. Magnet valve device 124 is provided with a cut-off valve 130 which is urged toward unseated position by a spring 134, and to seated position by action of an electromagnet in the upper part of the valve device casing, which when energized actuates the valve downwardly to seated position.

The release magnet valve device 126 is provided with a release valve 131 which is urged to seated position by a spring 132, and to unseated position by action of an electromagnet in the upper part of the casing, which when energized actuates the valve to unseated position.

Current to energize the electromagnets in the magnet valve devices is supplied through a supply conductor 136, and returns by way of return conductors 137. In parallel with the electromagnets of each magnet valve device is an indicating device 138, such for example as a lamp, for the purpose of indicating when each magnet valve device has been energized.

A reservoir 78 and a brake valve device 80, as employed in connection with the arrangement shown in Fig. 1, may be also used in connection with the embodiment shown in Fig. 5.

In the operation of the embodiment shown in Fig. 5, an application of the brakes may be effected by operation of the brake valve device 80, as described in connection with Fig. 1. Fluid supplied to the brake cylinder 128 flows past the unseated cut-off valve 130 in the magnet valve device 124. When the vehicle wheel 14 is rotating at a speed corresponding to the speed of the vehicle, both tracer wheels 100 and 106 will be driven at the same speed, so that the ring gear 28 will be idle.

If after the brakes are applied, the vehicle wheel 14 should begin to slide, then ring gear 28 will operate according to the differential between the speed of the two tracer wheels, and the centrifuge section will therefore operate the crosshead 114 upwardly. Upward movement of the crosshead 114 actuates the toggle mechanism 118 to bridge contacts 122 to energize the electromagnet in the magnet valve device 124. Energization of this electromagnet seats the cut-off valve 130, to cut off flow of fluid under pressure to the brake cylinder.

If the crosshead member 114 is moved upwardly a sufficient distance, toggle mechanism 116 will be actuated to bridge contacts 120, whereupon the electromagnet in the magnet valve device 126 will be energized to cause unseating of the release valve 131. Unseating of this valve releases fluid pressure from the brake cylinder to the atmosphere by way of port 135 in the magnet valve device. When each magnet valve device is energized the indicating devices 138 so indicate.

As soon as the brakes have been released sufficiently to permit wheel 14 to roll again at a speed corresponding substantially to that of the vehicle, the crosshead member 114 will be returned to its lowermost position, by action of the centrifuge spring 70. When the crosshead member returns to its lowermost position the two toggle mechanisms operate successively to first deenergize the magnet valve device 126 and then the device 124. Deenergization of these devices will of course first cut off venting of the brake cylinder to the atmosphere and then readmit fluid to the brake cylinder. The brakes will therefore be reapplied and will so remain as long as the wheel 14 rotates at a speed corresponding substantially to that of the vehicle.

In the embodiments shown in Figs. 1 and 5, the operation of the brake controlling mechanisms 10 and 88 has been dependent upon a speed differential between a tracer wheel rotated by a vehicle wheel and a tracer wheel rotated by engagement with a track rail. In the embodiment shown in Fig. 6 a brake controlling mechanism 142, which is similar to the type shown in Fig. 1, is connected to tracer wheels 144 and 146, each of which is held in engagement with a vehicle wheel 148, by action of springs 150 reacting against some portion 152 of the vehicle. The brake controlling mechanism 142 is therefore actuated upon a differential in the speed of rotation of the two vehicle wheels 148, to control the flow of fluid to the brake cylinder 20, in the manner described in connection with the embodiment shown in Fig. 1.

Each of the tracer wheels 144 and 146 may be coupled to a rigid shaft connecting with one of differential gears 32 and 33, and as is shown in Fig. 7 the coupling may be made through bevel gears 154.

While the brake controlling mechanism 142 has been shown as being similar to that of Fig. 1, it will be understood that the brake controlling mechanism 88 of Fig. 5 may be similarly employed. In fact, it will be quite apparent to those skilled in the art that an interchange of parts and units between the several embodiments shown may be made without departing from the scope of this invention.

In Fig. 8 is shown a fluid type switch device 156, which may replace either the valve portion 26 of the brake controlling mechanism 10 or the switch section 94 of the brake controlling mechanism 88. This fluid switch device comprises a casing 158 defining a cup-shaped chamber containing an electrically conducting fluid 160, such as mercury or the like, which upon rotation of the casing 158 is forced upwardly and outwardly into recesses 162, to interrupt the circuit between contact elements 164 formed by the fluid.

Contact elements 164 are interposed in a circuit through which current is supplied to a magnet valve device 166, which controls the supply of fluid under pressure to and its release from the brake cylinder 20. The magnet valve device 166 is provided with a double beat valve 168, which is urged toward an upper seated position by a spring 170, but is normally held in a lower seated position by action of an electromagnet in the magnet valve device, which is normally energized through contact elements 164, when the conducting fluid in the casing 158 connects the contact elements.

When the vehicle wheel begins to slide and the casing 158 is rotated above a certain predetermined speed, the fluid 160 is forced outwardly and the circuit through contacts 164 is interrupted, whereupon the electromagnet in the magnet valve device 166 is deenergized, and spring 170 urges the double beat valve 168 to upper seated position.

In this position fluid to the brake cylinder is cut off, and fluid pressure in the brake cylinder released to the atmosphere by way of port 172. As soon as the sliding wheel commences to rotate again, the casing 158 will no longer be rotated, and the circuit to the electromagnet in the magnet valve device will be closed, so that fluid under pressure is again supplied to the brake cylinder.

While we have described our invention in connection with several embodiments thereof, it is to be understood that we do not wish to be limited to the specific embodiments shown, or otherwise than by the spirit and scope of the appended claims.

Having now described our invention, what we claim as new and desire to secure by Letters Patent, is:

1. In a vehicle brake apparatus, the combination with braking means, of valve means for controlling the degree of application of the brakes, means operated according to the speed of the vehicle, means operated according to the speed of a vehicle wheel, and means rendered operable upon a decrease in the speed of said wheel below that corresponding to the speed of said vehicle for effecting operation of said valve means to diminish the degree of application of the brakes and operable upon a return of said wheel to a speed corresponding to the speed of the vehicle to increase the degree.

2. In a vehicle brake system, in combination, fluid pressure brake means, means providing a communication through which fluid under pressure is supplied to effect an application of said brake means, valve means controlling said communication, and means operable when rotated above a predetermined speed to effect operation of said valve means to close said communication.

3. In a vehicle brake system, in combination, fluid pressure brake means, means providing a communication through which fluid under pressure is supplied to effect an application of said brake means, valve means for controlling said communication, and means operable when rotated above a predetermined speed to effect operation of said valve means to open said communication to the atmosphere.

4. In a vehicle brake system, in combination, fluid pressure brake means, means providing a communication through which fluid under pressure is supplied to effect an application of said brake means, means for effecting a supply of fluid under pressure through said communication; a valve device shiftable from a biased position to an operative position to close said communication and to establish a communication between said brake means and the atmosphere, and means operable when rotated above a predetermined speed to effect operation of said valve device to said operative position and operable when subsequently rotated below said predetermined speed to permit said valve device to shift to said biased position.

5. In a vehicle brake system, in combination, fluid pressure brake means, means providing a communication through which fluid under pressure is supplied to effect an application of said brake means, valve means for controlling said communication, means operable when rotated above a predetermined speed to effect operation of said valve means to close said communication, and means for effecting rotation of said last means during a slipping or sliding condition of the vehicle wheels only.

6. In a vehicle brake system, in combination, fluid pressure brake means, means providing a communication through which fluid under pressure is supplied to effect an application of said brake means, a valve device shiftable to an operating position to close said communication and to effect a release of fluid under pressure from said fluid pressure brake means, rotative means operable when rotated at or above a predetermined speed to shift said valve device to said operative position, a first element rotated according to the speed of the vehicle, a second element rotated according to the speed of a vehicle wheel, and means operated upon a differential in the speed of rotation of said two elements for rotating said rotative means.

7. In a vehicle brake system, in combination, a brake cylinder, means providing a communication through which fluid under pressure is supplied to said brake cylinder, a valve operable to close said communication and to establish a second communication from said brake cylinder to the atmosphere, a member operable when rotated above a predetermined speed to operate said valve, and means for rotating said member during sliding of a vehicle wheel.

8. In a vehicle brake system, in combination, a brake cylinder, means providing a source of supply of fluid under pressure, means for establishing a communication between said source and said brake cylinder, a valve shiftable to an operative position to establish a communication from said brake cylinder to the atmosphere, an element operable when rotated above a predetermined speed to shift said valve to operative position, and means for preventing undue loss of fluid from said source to said atmosphere when said valve is in operative position.

9. In a vehicle brake system, in combination, a brake cylinder, means for effecting a supply of fluid under pressure to said brake cylinder, a switch mechanism having two sets of contacts, means operable when rotated above a predetermined speed to effect operation of one of said sets of contacts and when operated at a still higher speed to effect operation of the other of said sets of contacts, a magnet valve device responsive to operation of said first set of contacts for cutting off said supply to said brake cylinder, a second magnet valve device responsive to operation of said second set of contacts for releasing fluid under pressure from said brake cylinder, and means for indicating when each of said sets of contacts has been operated.

10. In a vehicle brake system, in combination, fluid presure brake means, means for effecting a supply of fluid under pressure to operate said brake means, switch means having two sets of contacts, rotatable means operable when rotated at one speed to effect opening of one of said sets of contacts and operable when rotated at a different speed to effect opening of the other of said sets of contacts, and electroresponsive valve means operable upon operation of said first set of contacts to cut off said supply to said brake means and operable upon operation of said second set of contacts to effect a release of fluid under pressure from said brake means.

11. In a vehicle brake system, in combination, fluid pressure brake means, means for effecting a supply of fluid under pressure to operate said brake means, a first set of contacts and a second set of contacts, rotatable means operable when rotated at one predetermined speed to operate said first set of contacts and when rotated at a second predetermined speed to operate said second set of contacts, means operated upon sliding of a vehicle wheel for effecting rotation of said rotatable means, and electroresponsive valve means operated in response to operation of said first set of contacts for cutting off said supply and in response to operation of said second set of contacts for effecting a release of fluid supplied to operate said brake means.

12. In a vehicle brake system, in combination, brake means, means for effecting an application of said brake means, a switch mechanism having a chamber containing a fluid conducting medium and contacts disposed in and electrically connected by said medium, said switch mechanism being rotatable to centrifugally displace said medium to electrically disconnect said contacts, and means operable when said contacts are thus disconnected to diminish the degree of application of said brake means.

13. In a vehicle brake system, in combination, a brake cylinder, means for effecting a supply of fluid under pressure to said brake cylinder, a switch mechanism having contacts electrically connected by a fluid conducting medium and being rotatable to displace said conducting medium to disconnect said contacts, means for rotating said switch mechanism upon sliding of a vehicle wheel, and a magnet valve device responsive to disconnection of said contacts for cutting off the supply to and effecting a release of fluid under pressure from said brake cylinder.

EARLE S. COOK.
CHARLES F. HAMMER.